United States Patent [19]

Ireton

[11] Patent Number: 5,826,089
[45] Date of Patent: Oct. 20, 1998

[54] INSTRUCTION TRANSLATION UNIT CONFIGURED TO TRANSLATE FROM A FIRST INSTRUCTION SET TO A SECOND INSTRUCTION SET

[75] Inventor: Mark A. Ireton, Austin, Tex.

[73] Assignee: Advanced Micro Devices, Inc., Sunnyvale, Calif.

[21] Appl. No.: 583,154

[22] Filed: Jan. 4, 1996

[51] Int. Cl.$^6$ .................................................. G06F 9/45
[52] U.S. Cl. .......................................... 395/707; 395/385
[58] Field of Search ................................... 395/707, 385, 395/567

[56] References Cited

U.S. PATENT DOCUMENTS

| | | | |
|---|---|---|---|
| 4,843,545 | 6/1989 | Kikuchi .................................. | 395/707 |
| 5,301,325 | 4/1994 | Benson .................................. | 395/707 |
| 5,339,428 | 8/1994 | Burmeister et al. ..................... | 395/707 |
| 5,613,117 | 3/1997 | Davidson et al. ....................... | 395/708 |
| 5,619,665 | 4/1997 | Emma ..................................... | 395/384 |

FOREIGN PATENT DOCUMENTS

| | | |
|---|---|---|
| 0 463 296 A | 1/1992 | European Pat. Off. . |
| 93 20505 A | 10/1993 | WIPO . |
| 93 20507 A | 10/1993 | WIPO . |

OTHER PUBLICATIONS

Byte—"Intel's successor to the Pentium is an impressive microprocessor, a bold new generation of CISC. But is it enough to keep AMD, Cyrix, and NexGen at Bay?"—Halfhill, Tom R.—Apr. 1995—pp. 42, 46, 48, 50, 52, 53, 54, 56, 58.

Ohr, S, "Superlong Instructions Help Supermini Refine Number Crunching," vol. 33, No. 26, Nov. 1, 1985, pp. 41–42, 44.

International Search Report for PCT/US 96/19588 dated Apr. 28, 1997.

*Primary Examiner*—Robert B. Harrell
*Assistant Examiner*—Kenneth R. Coulter
*Attorney, Agent, or Firm*—Conley, Rose & Tayon, PC; B. Noel Kivlin

[57] ABSTRACT

An instruction translation unit is provided which reduces instructions from a source instruction set to a set of intermediate, atomic operations. The atomic operations are then recombined into instructions in the target instruction set. An execution core coupled to the instruction translation unit may be configured to execute instructions from the target instruction set. However, compatibility with the source instruction set is maintained. By reducing a plurality of source instructions into atomic operations, portions of multiple source instructions may be combined into a target instructions. The execution core may thereby be more efficiently utilized.

10 Claims, 6 Drawing Sheets

INSTRUCTION TRANSLATION UNIT CONFIGURED TO TRANSLATE FROM A FIRST INSTRUCTION SET TO A SECOND INSTRUCTION SET

BACKGROUND OF THE INVENTION

1. Field of the Invention

This invention is related to the field of microprocessors and, more particularly, to an instruction translation unit for a microprocessor. The instruction translation unit translates instructions from one instruction set to another instruction set using an intermediate, atomic set of operations.

2. Description of the Relevant Art

Microprocessors are an integral part of computer systems, generally controlling other devices within the computer system. The performance of the computer system is often in large part dictated by the performance of the microprocessors included within the system. As used herein, the term microprocessor refers to an integrated circuit configured to execute instructions from an instruction set and to interface to other devices in a computer system in order to convey actions required by the instructions being executed. Exemplary microprocessors are general purpose microprocessors such as x86 microprocessors which control the entire computer system, microcontrollers often included within devices in a computer system to perform specific processing functions unique to the devices, and digital signal processors optimized for performing signal processing functions.

A sequence of instructions (i.e. a program) executed by the microprocessor defines the operations to be performed by the computer system, as well as the order of those operations. An instruction set comprises a plurality of instructions which a microprocessor is configured to execute. Each instruction has a particular encoding of bits which uniquely identifies the instruction within the instruction set. The microprocessor includes circuitry configured to recognize each instruction and perform operations defined for that instruction. Instruction sets are generally classified as fixed length instruction sets or variable length instructions sets. In fixed length instruction sets, each instruction is represented by a set number of bits. The set number of bits is equal for each instruction within the instruction set. In variable length instruction sets, each instruction is specified by a variable number of bits.

Over time, advances in the semiconductor processing technologies with which microprocessors are manufactured have enabled increasing numbers of transistors to be configured onto a single substrate. Microprocessor manufacturers have used the additional transistors to continually increase the features and performance of microprocessors. For example, early microprocessors were configured to operate upon eight bit operands. Modern microprocessors operate upon 32 bit or even 64 bit operands. Additionally, such features as speculative execution and superscalar microprocessor topologies have been added to microprocessors.

In order to preserve investments in computer programs written for early microprocessors, modern microprocessors have often included hardware for executing these computer programs. For example, the 80486 microprocessor executes instruction sequences written for the 8086 microprocessor. In this manner, earlier computer programs continue to function on modern day microprocessors. Newly created programs may take advantage of the additional features included in the modern microprocessors.

Unfortunately, retaining compatibility with earlier versions of microprocessors creates several problems for the design and manufacture of modern microprocessors. Each new version of a microprocessor employing a particular microprocessor architecture (which includes an instruction set as well as other details important to computer program designers, such as the memory access model and any address translation structures, etc.) is made more complex by the large legacy of previous versions. For example, although modern x86 microprocessors are capable of operating upon 32 bit operands, hardware is included for operating upon eight bit operands for compatibility with earlier x86 microprocessors. The problem is magnified for microprocessors employing an entirely new microprocessor architecture, but which are still compatible with a prior microprocessor architecture. Such microprocessors effectively include hardware for recognizing and executing two instruction sets. The added functionality which may be included in the new version of the microprocessor may be restricted due to the number of transistors devoted to compatibility. In other words, the number of transistors available for adding functionality is reduced by the number of transistors used for compatibility.

Additionally, verifying that the microprocessor is indeed compatible with each prior version becomes overwhelming as the number of those versions increases. A significant amount of time and resources are consumed in the compatibility verification process. More time and resources are required for verifying the newly created functionality. A method for maintaining compatibility with previous versions of a microprocessor while reducing the complexity of the compatibility function and therefore the amount of hardware devoted to maintaining compatibility is desired.

SUMMARY OF THE INVENTION

The problems outlined above are in large part solved by an instruction translation unit in accordance with the present invention. The instruction translation unit reduces instructions from a source instruction set to a set of intermediate, atomic operations. The atomic operations are recombined into instructions in the target instruction set. Advantageously, an execution core coupled to the instruction translation unit may be configured to execute instructions from the target instruction set. However, compatibility with the source instruction set is maintained. Investments made in programs written in the source instruction set are retained while enabling programs written in the target instruction set to be executed by an execution core unencumbered by hardware for executing the source instruction set. Advanced hardware structures may be employed by the execution core, which may increase performance of the microprocessor.

By reducing a plurality of source instructions into atomic operations, portions of multiple source instructions may be combined into a target instructions. The execution core may thereby be more efficiently utilized, as more is accomplished by each instruction than if instructions were translated serially. Instruction code written in the source instruction set may thereby enjoy increased performance when executed upon a microprocessor employing the present instruction translation unit.

Broadly speaking, the present invention contemplates a method for translating instructions from a first instruction set to a second instruction set using an instruction translation unit, comprising several steps. A first plurality of instructions from the first instruction set is reduced to a plurality of intermediate atomic operations. One or more of the plurality of intermediate atomic operations are then recombined into a second instruction from the second instruction set.

The present invention further contemplates a microprocessor comprising an instruction cache and an instruction translation unit. The instruction cache is configured to store a plurality of instructions from a first instruction set and further configured to provide a first instruction from the plurality of instructions to the instruction translation unit. The instruction translation unit is coupled to receive the first instruction, and comprises and instruction atomizing unit and an instruction recombination unit. The instruction atomizing unit is configured to generate a plurality of intermediate operations corresponding to the first instruction. The instruction recombination unit is coupled to receive the plurality of intermediate operations and to combine one or more of the plurality of intermediate operations into a second instruction from a second instruction set.

The present invention still further contemplates a computer system, comprising a main memory and a microprocessor. The main memory is configured to store instructions from a first instruction set. Coupled to the main memory, the microprocessor comprises an instruction cache and an instruction translation unit. The instruction cache is configured to store a plurality of instructions from the first instruction set and further configured to provide a first instruction from the plurality of instructions to an instruction translation unit. The instruction translation unit is coupled to receive the first instruction from the instruction cache, to reduce the first instruction to a plurality of intermediate operations, and to recombine the plurality of intermediate operations into one or more second instructions from a second instruction set.

BRIEF DESCRIPTION OF THE DRAWINGS

Other objects and advantages of the invention will become apparent upon reading the following detailed description and upon reference to the accompanying drawings in which.

Figure 1:
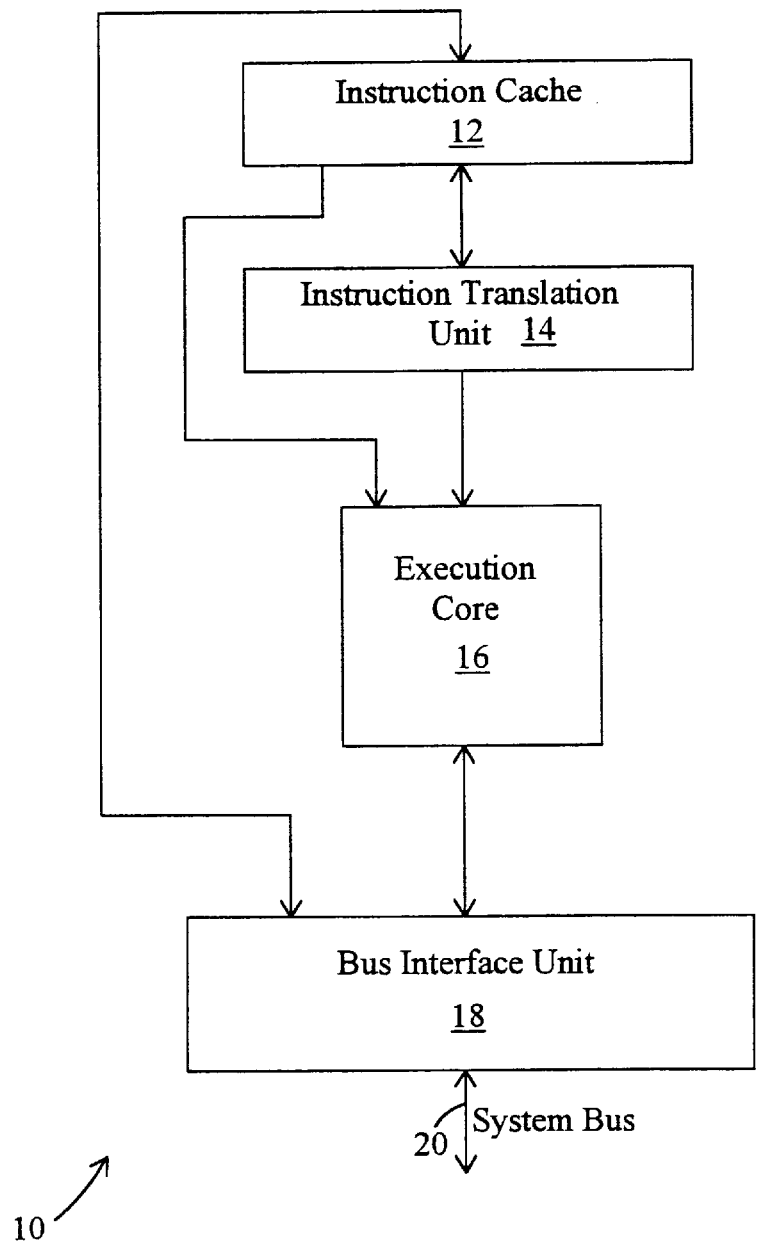
FIG. 1 is a block diagram of a microprocessor including an instruction translation unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes an instruction cache 12, an instruction translation unit 14, an execution core 16, and a bus interface unit 18. Bus interface unit 18 is coupled to a system bus 20, instruction cache 12, and execution core 16. Instruction cache 12 is coupled to execution core 16 and instruction translation unit 14, which is further coupled to execution core 16.

Generally speaking, instruction translation unit 14 is configured to translate instructions from a first instruction set to a second instruction set. The first instruction set may be associated with a previously manufactured microprocessor, while the second instruction set corresponds to execution core 16. In one embodiment, the first instruction set comprises the instruction set defined by the x86 microprocessor architecture, and the second instruction set comprises the ADSP 2171 instruction set employed by the ADSP 2171 digital signal processor available from Analog Devices, Inc. of Norwood, Mass.

Instruction translation unit 14 reduces the instructions from the first instruction set into a set of intermediate operations. The intermediate operations are "atomic operations", meaning that the operations do not divide into simpler operations in a natural fashion. For example, an add instruction which accesses a memory operand, adds the value to a register operand, and stores the result in the memory operand includes four atomic operations. First, an address generation operation is performed to generate the address for the memory operand. Second, a load memory operation is performed to access the memory operand. Third, an addition operation is performed upon the memory operand and the register operand. Finally, a store memory operation is performed to return the addition result to main memory.

The atomic operations thus created are then checked for dependencies. A dependency exists between a first atomic operation and a second atomic operation if the first atomic operation produces a value required as an input to the second atomic operation, and the target instruction set does not allow combination of the two operations into one operation. For example, a multiply atomic operation may produce a product which is used as an operand of a subsequent add atomic operation. If the target instruction set includes a multiply-add instruction in which a pair of operands are multiplied and the product added to a third operand, then no dependency exists between the multiply and the add atomic operations within the target instruction set.

Finally, the dependency-checked atomic operations are recombined into an instruction from the second instruction set. The recombination combines up to a maximum number of atomic operations which may be included in an instruction within the instruction set of execution core 16. In one embodiment, the maximum number of atomic operations is defined as the number of operations which may be executed in parallel by execution core 16. Each instruction created by instruction translation unit 14 is transmitted by instruction translation unit 14 to execution core 16. Advantageously, instructions are translated from the first instruction set to the second instruction set. By reducing the instructions to a series of atomic operations, instruction translation unit 14 may recombine portions of multiple instructions into an instruction for execution core 16. Therefore, instruction translation unit 14 may more efficiently utilize available resources within execution core 16.

Instruction cache 12 is configured to store a plurality of instructions from the first instruction set (or source instruction set) as well as instructions from the second instruction set (or target instruction set). Each cache line includes an indication of whether or not the stored instructions are source instructions or target instructions. If the instructions are target instructions, then the instructions are directly dispatched to execution core 16 without passing through instruction translation unit 14. If the instructions are source instructions, the instructions are dispatched to instruction translation unit 14 for translation into target instructions. It is noted that instruction cache 12 may be configured in a set-associative or direct-mapped configuration. Instruction cache 12 fetches instructions in program order and provides these instructions to instruction translation unit 14. It is noted that instruction cache 12 may include a branch prediction structure to predict branch instructions taken or not taken, and to speculatively fetch instructions from the predicted instruction stream. If execution core 16 executes the branch instruction and finds it to be mispredicted, then the speculatively fetched instructions are flushed.

Execution core 16 includes circuitry for executing instructions from the second instruction set (or target instruction set). In one embodiment, execution core 16 is an ADSP 2171 compatible execution core. Execution core 16 is configured to access data operands which are stored in main memory by conveying requests for those data operands to bus interface unit 18.

Bus interface unit 18 is configured to effect communication between microprocessor 12 and devices coupled to system bus 20. For example, instruction fetches which miss instruction cache 12 may be transferred from a main memory upon system bus 20 by bus interface unit 18. Similarly, memory operations performed by execution core 16 which miss a data cache configured therein may be transferred from main memory by bus interface unit 18. Additionally, the data cache may discard a cache line of data which has been modified by microprocessor 10. Bus interface unit 18 transfers the modified line to main memory.

Figure 2:
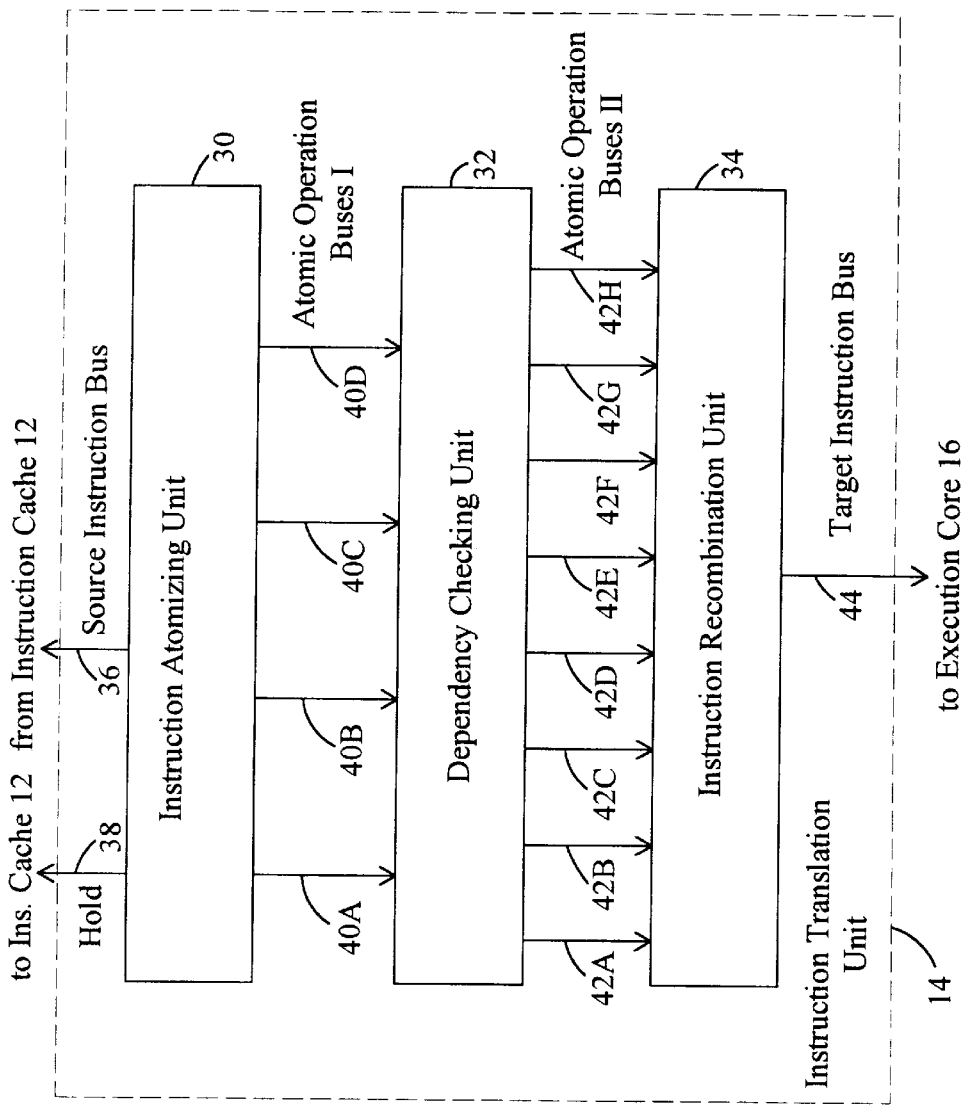
FIG. 2 is a block diagram of one embodiment of the instruction translation unit shown in FIG. 1, including an instruction atomizing unit, a dependency checking unit, and an instruction recombination unit.

Turning now to FIG. 2, a block diagram of one embodiment of instruction translation unit 14 is shown. Instruction translation unit 14 includes an instruction atomizing unit 30, a dependency checking unit 32, and an instruction recombination unit 34. A source instruction bus 36 and a hold conductor 38 are coupled between instruction atomizing unit 30 and instruction cache 12. A first plurality of atomic instruction buses 40 (including instruction buses 40A, 40B, 40C, and 40D) are coupled between instruction atomizing unit 30 and dependency checking unit 32. A second plurality of atomic instruction buses 42 (including instructions buses 42A, 42B, 42C, 42D, 42E, 42F, 42G, and 42H) are coupled between dependency checking unit 32 and instruction recombination unit 34. Finally, a target instruction bus 44 is coupled between instruction recombination unit 34 and execution core 16.

Instruction atomizing unit 30 receives instructions from instruction cache 12 upon source instruction bus 36. Instruction atomizing unit 30 reduces the instructions to a set of atomic operations corresponding to the operations defined for the instructions. The atomic operations are conveyed upon atomic operation buses 40 to dependency checking unit 32. In one embodiment, each atomic operation comprises a value identifying the atomic operation from a set of predefined atomic operations, indications of the operands for the atomic operation, and an indication of the destination. The operands and destination may correspond to a register or memory location as defined in the source instruction set, or they may correspond to temporary results generated for use by a subsequent atomic operation within the same source instruction. Each atomic operation bus 40A–40D conveys atomic operations associated with a particular source instruction. Therefore, the embodiment shown processes up to four source instructions in parallel. Other embodiments may process more or less instructions.

Dependency checking unit 32 performs dependency checking upon the atomic operations conveyed from instruction atomizing unit 30. Additionally, dependency checking unit 32 may store previously conveyed operations, and dependency checking is performed against the stored operations as well. An indication of dependency is conveyed upon atomic operations buses 42, along with the information received upon atomic operations buses 40. In the embodiment shown, each atomic operations bus 42 conveys information regarding one atomic operation. Therefore, the embodiment of FIG. 2 is capable of conveying up to eight atomic operations to instruction recombination unit 34 concurrently.

Instruction recombination unit 34 receives the atomic operations upon atomic operations buses 42 and creates target instructions from the target instruction set. The target instructions are conveyed to execution core 16 upon target instruction bus 44. Instruction recombination unit 34 does not combine operations which have a dependency as determined by dependency checking unit 32.

Figure 3:
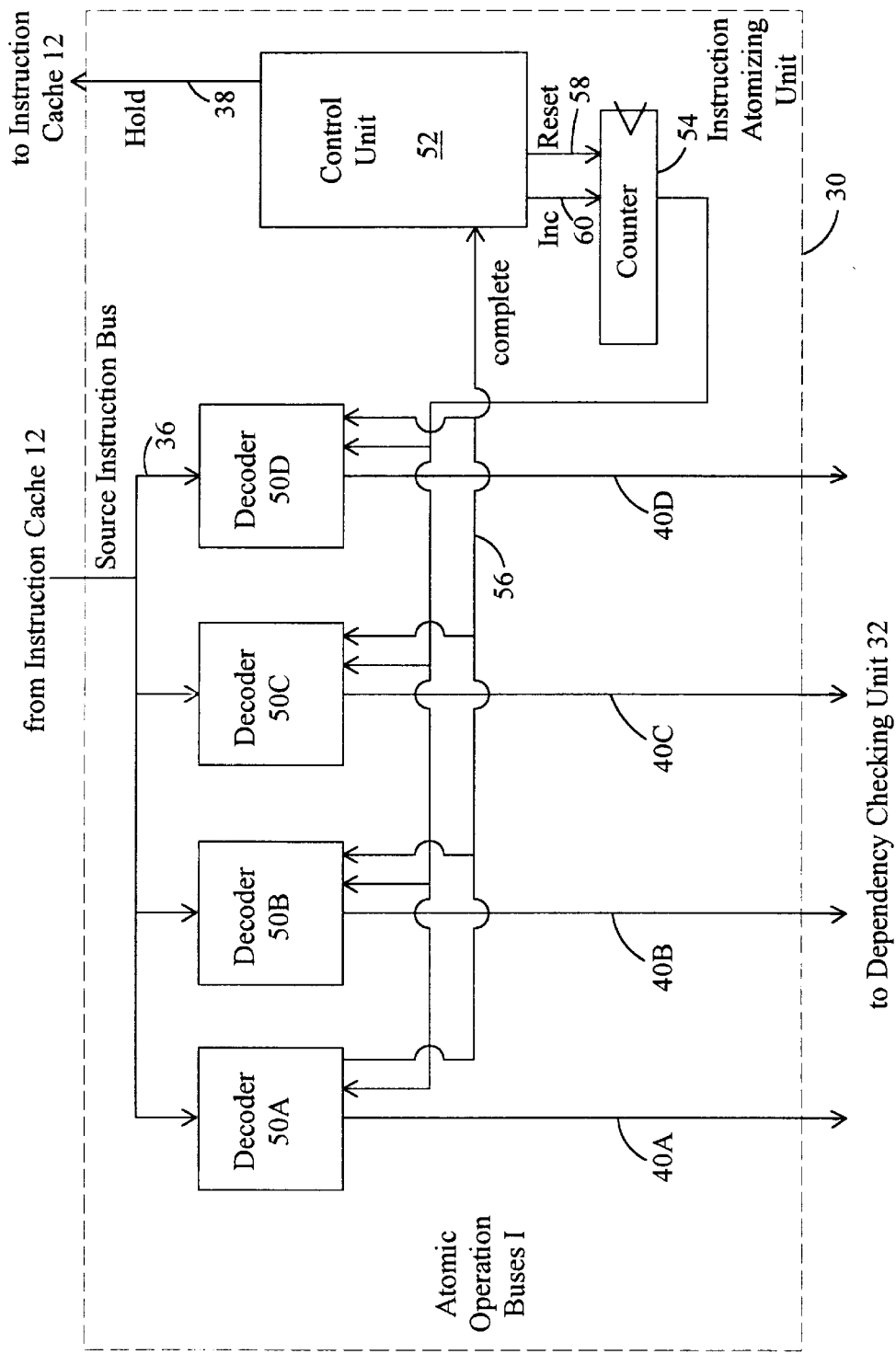
FIG. 3 is a block diagram of one embodiment of the instruction atomizer shown in FIG. 2.

Turning now to FIG. 3, a block diagram of one embodiment of instruction atomizing unit 30 is shown. Instruction atomizing unit 30 includes a plurality of decoders 50A, 50B, 50C, and 50D. Each decoder 50 is coupled to source instruction bus 36 and to one of the atomic operation buses forming atomic operation buses 40. For example, decoder 50A is coupled to atomic operation bus 40A. A control unit 52 is included, coupled to hold conductor 38. Control unit 52 is further coupled to a counter 54.

Each of decoders 50 is configured to generate atomic operations upon receiving an instruction from instruction cache 12 upon source instruction bus 36. Decoder 50A generates atomic operations for the first instruction received upon source instruction bus 36; decoder 50B generates atomic operations for the second instruction received upon source instruction bus 36; etc. The atomic operations are conveyed upon atomic operations buses 40A, 40B, etc. As noted above, each atomic operation includes a value indicative of the atomic operation as well as operands and a destination. Decoders 50 generate the operands and destination as either operands of the source instruction or as temporary operands internal to the atomic operations of the source instruction. Each operand corresponds to a particular storage location (such as a register or memory) within execution core 16. In other words, storage locations within execution core 16 are assigned to storage locations defined by the source instruction set or to temporary storage locations.

According to one embodiment, if an instruction corresponds to four atomic operations or less, then the instruction is completed in one attempt through instruction atomizing unit 30. Each decoder 50 asserts a complete signal upon a complete bus 56 to control unit 52 if the instruction being decoded corresponds to four atomic operations or less. If each decoder 50 asserts a corresponding complete signal, then the set of instructions currently being decoded are complete and instruction cache 12 may present subsequent instructions for decoding.

Alternatively, a particular instruction may correspond to more than four atomic operations. In this case, the decoder 50A–50D which is decoding the particular instruction does not assert the corresponding complete signal to control unit 52. Therefore, control unit 52 asserts a hold signal upon hold conductor 38. Instruction cache 12 is configured to present the same set of instructions currently being presented to instruction atomizing unit 30 during the next clock cycle when an asserted hold signal is received. Decoders 50 thereby receive the same instructions during a subsequent clock cycle. The decoder 50 which is decoding the particular instruction may thereby generate additional atomic operations corresponding to the instruction.

Each decoder 50A–50D receives the complete signals from other decoders 50 which receive instructions prior to the instruction received by the decoder 50A–50D in program order. If any of the received complete signals are not asserted, then the decoder 50A–50D does not convey atomic operations during that clock cycle. In this manner, dependency checking unit 32 does not receive atomic operations corresponding to an instruction until it has received or is concurrently receiving the atomic operations corresponding to each of the prior instructions in program order.

Counter 54 stores multiple count values, one count value for each decoder 50. Decoders 50 receive the corresponding count values from counter 54, and include the count value during decoding of the received instruction. If the count value is zero, then the first four atomic operations corresponding to the instruction are conveyed. If the count value is one, the second set of four atomic operations corresponding to the instruction are conveyed, etc. During the first attempt of instructions from instruction cache 12, the count value corresponding to each decoder 50 is zero. Control unit 52 asserts a reset line 58 to counter 54 during times in which all complete signals are asserted, in order to guarantee that the following cycle each count value is zero. When a particular complete signal is not asserted, increment signals upon increment bus 60 are asserted to cause count values to be incremented for certain decoders 50. The decoders 50 for which count values are incremented are the decoders which receive instructions which are prior to the instruction which was not completed (in program order). These decoders 50 have completed decode of the corresponding instructions, and so no atomic operations will be conveyed from these decoders 50. Additionally, the count value corresponding to the decoder 50A–50D which did not assert its complete signal is incremented, such that subsequent atomic operations may be conveyed. Finally, count values corresponding to decoders 50 which receive instructions subsequent to the uncompleted instruction are not incremented. These decoders 50 have yet to convey atomic operations corresponding to the instruction, due to the deasserted complete signal in the previous clock cycle.

The above sequence of incrementing counters and representing instructions is continued until each decoder 50A–50D asserts the corresponding complete signal. A next set of instructions may then be fetched from instruction cache 12. As noted above, control unit 52 resets counter 54 when all complete signals are asserted. Additionally, the hold signal upon hold conductor 38 is deasserted when all the complete signals are asserted.

In one exemplary embodiment, the atomic operations generated by instruction atomizing unit 30 are: load memory operation, store memory operation, address generation, arithmetic operation (i.e. add, subtract, multiply, divide, increment, decrement, etc.), logical operation (i.e. AND, OR, shift, rotate, etc.), branch, flag manipulation, and compare. Table 1 below shows several exemplary x86 instructions along with the corresponding atomic operations.

TABLE 1

Exemplary x86 Instructions and Corresponding Atomic Operations

| x86 Instruction | Atomic Operations |
|---|---|
| ADD EAX, [EBX+DISP] | address generation (EBX+DISP) |
|  | load memory operation |
|  | add |
| PUSH EAX | address generation (ESP-4) |
|  | store memory operation |
| POPAD | load memory operation |
|  | address generation (ESP+4) |
|  | load memory operation |
|  | address generation (ESP+4) |
|  | load memory operation |
|  | address generation (ESP+4) |
|  | load memory operation |
|  | address generation (ESP+4) |
|  | load memory operation |
|  | address generation (ESP+4) |
|  | load memory operation |
|  | address generation (ESP+4) |
|  | load memory operation |
|  | address generation (ESP+4) |
|  | load memory operation |
|  | address generation (ESP+4) |

Figure 4:
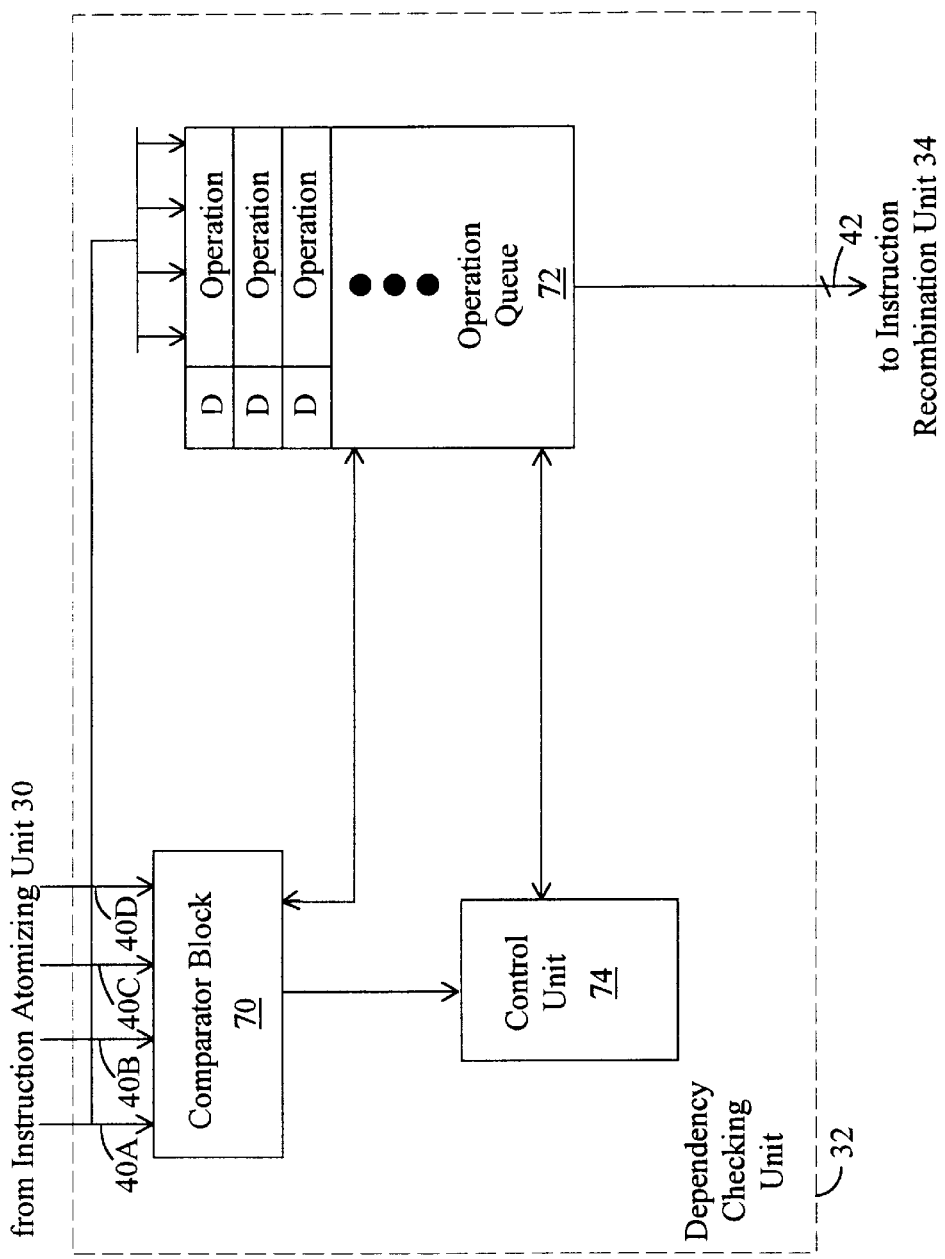
FIG. 4 is a block diagram of one embodiment of the dependency checking unit shown in FIG. 2.

Turning now to FIG. 4, a block diagram of one embodiment of dependency checking unit 32 is shown. Dependency checking unit 32 includes a comparator block 70, an operation queue 72, and a control unit 74. Comparator block 70 and operation queue 72 are each coupled to control unit 74 and to atomic operation buses 40. Additionally, comparator block 70 is coupled to operation queue 72. Operation queue 72 is coupled to atomic operation buses 42.

Comparator block 70 includes comparator circuits for detecting dependencies between atomic operations. Each atomic operation conveyed upon atomic operation buses 40 is compared to (i) other atomic operations conveyed upon atomic operation buses 40; and (ii) operations stored in operation queue 72. Results of the comparisons are conveyed to control unit 74. The comparators compare the destination of an atomic operation to the source operands of subsequent atomic operations (in program order). Atomic operations which receive data from other atomic operations are marked as dependent by control unit 74 unless execution core 16 is configured to perform the two atomic operations in the same clock cycle, passing the result of the first operation to the second operation. For example, execution core 16 may be configured to multiply two operands and pass the product to an adder to add the product to a third operand. A multiplication and an addition which receives the product of the multiplication may therefore be performed in parallel and are not dependent in the target instruction set.

If an atomic operation is found to be dependent upon another atomic operation, a dependency indication is set with respect to that atomic operation within operation queue 72 by control unit 74. In one embodiment, the dependency information comprises a bit indicative, when set, that the corresponding operation is dependent upon a prior operation. A stream of operations having no dependency bits set are therefore independent and eligible for recombination by instruction recombination unit 34.

Operation queue 72 includes a plurality of storage locations. Each storage location is configured to store an atomic operation as well as the corresponding dependency information. Operation queue 72 is operated as a first-in, first-out (FIFO) queue such that operations are conveyed upon atomic operations bus 42 in the order in which the operations arrived upon atomic operations bus 40. Program order is thereby maintained. The storage locations configured to store the operations which are first in program order within the queue are coupled to atomic operations bus 42, such that the operations may be conveyed to instruction recombination unit 34. It is noted that program order need not be maintained as long as program order between dependent atomic operations is maintained. Atomic operations which are mutually-independent may be conveyed to instruction recombination unit 34 in any order.

Control unit 74 controls the storage of operations into operation queue 72 in addition to setting the dependency fields of those operations for which dependencies are detected. New operations conveyed during a clock cycle upon atomic operations bus 40 are stored into operation queue 72, and instructions accepted by instruction recombination unit 34 are deleted from operation queue 72. In one embodiment, up to eight atomic operations may be conveyed to instruction recombination unit 34 during a clock cycle. If less than eight mutually-independent atomic operations are stored within operation queue 72, control unit 74 is configured not to convey the operations to instruction recombination unit 34. In this manner, more atomic operations may be dependency-checked against the operations, allowing more operations to be eligible for recombination. However, atomic operations may be dispatched by control unit 74 if instruction recombination unit 34 is idle. Furthermore, atomic operations are dispatched up to a detected dependency regardless of the number of atomic operations stored within operation queue 72. It is noted that instruction recombination unit 34 does not combine operations which were not dependency-checked against each other, as will be explained in more detail below.

Figure 5:
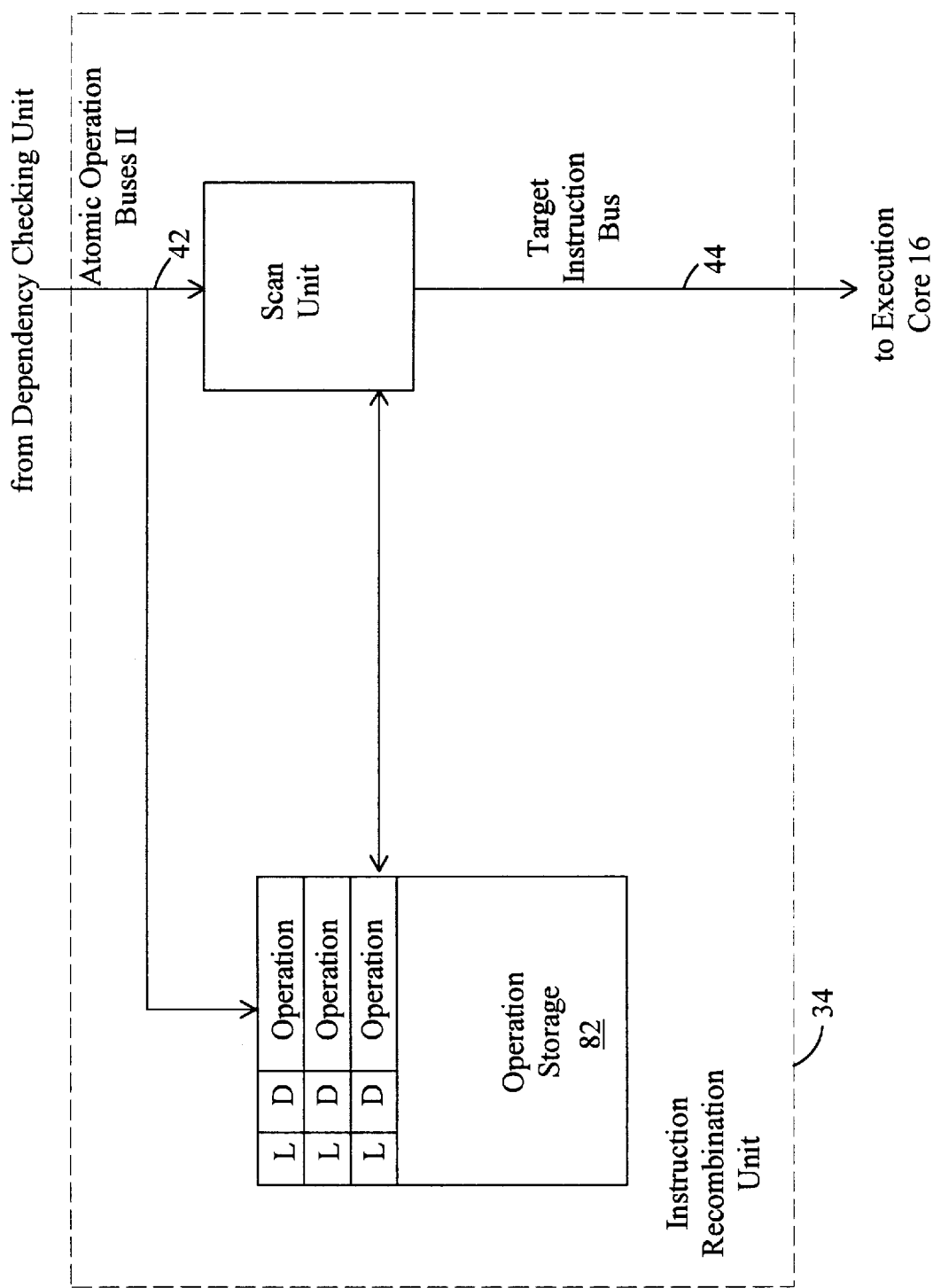
FIG. 5 is a block diagram of one embodiment of the instruction recombination unit shown in FIG. 2.

Turning next to FIG. 5, a block diagram of one embodiment of instruction recombination unit 34 is shown. Instruction recombination unit 34 includes a scan unit 80 and an operation storage 82. Both scan unit 80 and operation storage 82 are coupled to atomic operation buses 42. Scan unit 80 is coupled to operation storage 82 and to target instruction bus 44.

Scan unit 80 scans the atomic operations stored within operation storage 82 and received upon atomic operation buses 42 to determine which operations may be combined to form an instruction for execution core 16. The instruction thus formed is conveyed to execution core 16, and the atomic operations used to form the instruction are discarded. Atomic operations received during a clock cycle and not immediately used to form an instruction are stored in operation storage 82. Similar to the operation queue shown in FIG. 4, operation storage 82 is operated as a first-in, first-out buffer for operations. It is noted that operation storage 82 may not be strictly FIFO, in that atomic operations may be selected for recombination from throughout operation storage 82.

Operation storage 82 stores operations and corresponding dependency information, as conveyed upon atomic operation buses 42. Additionally, a last bit is stored which identifies the last operation within a group of operations concurrently transferred to operation storage 82. Because the operations transferred to instruction recombination unit 34 on different clock cycles have not been dependency-checked against each other, those operations are not eligible for being recombined into a single instruction. Scan unit 80, when storing atomic operations into operation storage 82, sets the last bit for the last operation stored into operation storage 82 for that clock cycle.

In one embodiment, execution unit 16 is compatible with the ADSP 2171. The ADSP 2171 is configured to perform two register loads, two increments of address pointer registers (i.e. registers used to identify the address of the two register loads), an addition, and a multiplication in parallel. The addition and multiplication use the contents of the registers being loaded prior to the load occurring. Instructions for the ADSP 2171 may therefore be configured to perform up to six atomic operations. Scan unit 80 searches the atomic operations within operation storage 82 and upon atomic operation buses 42 to formulate a list of operations which are eligible for recombination. An operation is eligible for recombination if: (i) the operation does not have a dependency bit set and does not have a last bit set; or (ii) the operation is a member of the oldest set of operations contained within operation storage 82. Once a set dependency bit or last bit is encountered, scan unit 80 ends the scan and forms an instruction from the list of eligible operations. Scan unit 80 combines as many of the eligible operations as possible under the constraints of the instruction set employed by execution core 16. The instruction is then conveyed to execution core 16 upon target instruction bus 44. It is noted that one of the operations within operation storage 82 or upon atomic operations bus 42 is prior to each of the other operations therein in program order. This operation is selected to be part of the instruction formed during a clock cycle. Other particular operations are selected based upon the particular operation's ability to be combined with the selected operation within the target instruction set, as well as the particular operation's ability to be combined with operations prior to the particular operation in program order which may be combined with the selected operation. It is noted that program order need not be maintained as long as dependent operations are maintained in program order with respect to the operations upon which they depend.

An example of instruction translation will now be described for an embodiment which translates x86 instructions to ADSP 2171 instructions. Table 2 shows an exemplary instruction sequence using x86 instructions. The instruction sequence corresponds to two iterations of instructions used to form the inner product of a pair of vectors A and B.

TABLE 2

Exemplary x86 Instruction Sequence

| Instruction | Comment |
| --- | --- |
| MOV EAX, [EDI] | read element of A from memory |
| INC EDI | increment pointer |
| MOV EBX, [ESI] | read element of B from memory |
| INC ESI | increment pointer |
| IMUL EAX, EBX | multiply |
| ADD EBP, EAX | accumulate |
| MOV EAX, [EDI] | read element of A from memory |
| INC EDI | increment pointer |
| MOV EBX, [ESI] | read element of B from memory |
| INC ESI | increment pointer |
| IMUL EAX, EBX | multiply |
| ADD EBP, EAX | accumulate |

Table 3 shows the atomic operations generated for the instructions listed in table 2. It is noted that no address generation steps are included since the addresses used are simply values stored within a register. For this example, each instruction generates a single atomic operation. However, many x86 instructions generate multiple atomic operations.

TABLE 3

Atomic Operations Corresponding to Exemplary x86 Instruction Sequence

| Instruction | Atomic Operations |
| --- | --- |
| MOV EAX, [EDI] | load memory operation |
| INC EDI | increment |
| MOV EBX, [ESI] | load memory operation |
| INC ESI | increment |
| IMUL EAX, EBX | multiply |
| ADD EBP, EAX | add |
| MOV EAX, [EDI] | load memory operation |
| INC EDI | increment |
| MOV EBX, [ESI] | load memory operation |
| INC ESI | increment |
| IMUL EAX, EBX | multiply |
| ADD EBP, EAX | add |

In the exemplary embodiments described above, instruction atomizing unit 30 generates the atomic operations for the first four instructions concurrently (i.e. instruction atomizing unit 30 "atomizes" the first four instructions). The middle set of four instructions are atomized during a subsequent clock cycle, and the final set of four instructions are atomized during yet another clock cycle. Dependency checking unit 32 detects no dependencies between the atomic operations corresponding to the first four instructions. As mentioned above, execution unit 16 is configured to perform two register loads and increments of the registers providing the addresses for the register loads (the "pointer registers"). Because no dependencies are detected and because the atomic operations for the first four instructions number four (i.e. less than eight), dependency checking unit 32 does not convey the atomic operations to instruction recombination unit 34 immediately.

When dependency checking unit 32 receives the atomic operations corresponding to the middle four instructions, a dependency is detected between the multiply operation and the register loads. The multiply operation uses the results of the register loads as operands, and execution core 16 is not configured to provide the results of a register load as an operand in one clock cycle. Dependency checking unit 32 conveys the first four atomic operations to instruction recombination unit 34. Instruction recombination unit 34 creates the corresponding instruction and conveys the instruction to execution core 16. No other dependencies are detected between the middle four atomic operations, since execution core 16 is configured to perform a multiply and an add using the product in one clock cycle, as well as to perform a register load and an increment of the associated pointer register.

When dependency checking unit 32 receives the last four atomic operations shown in the example, a dependency of the second multiply operation upon the register load operations in the middle four and last four atomic operations is detected. Therefore, the six atomic operations corresponding to the middle four instructions and the first two of the last four instructions are conveyed to instruction recombination unit 34. Instruction recombination unit 34 generates a single instruction from the six atomic operations, advantageously employing the resources of execution core 16 quite efficiently. The last two atomic operations remain in dependency checking unit 32, with a dependency bit set upon the multiply instruction, until additional instructions are received.

It can be seen from the example given that instruction translation unit 14 may generate highly efficient instruction code for execution core 16. Advantageously, the resources of execution core 16 are maximized for the task being performed upon a computer system employing instruction translation unit 14.

In an alternative embodiment, dependency checking unit 32 and instruction recombination unit 34 are combined such that dependency checking may be continuously performed upon operations stored in instruction recombination unit 34. Such an embodiment may eliminate the "last" indication since all instructions stored are dependency-checked against each other as the instructions are received by instruction recombination unit 34.

Although the exemplary embodiments presented above discuss a source instruction set and a target instruction set which are significantly different, it is contemplated that the instruction translation unit may be used to translate from previous versions of a particular instruction set to an improved version of the instruction set. Certain instructions from the previous version may be eliminated and replaced by instructions which may be similar to other instructions in the improved version of the instruction set. For example, a microprocessor may be configured to execute instructions in the 32-bit mode of the 80486 instruction set. Instructions from the 16-bit mode may be translated to similar instructions which execute in the 32 bit mode. More than one instruction may be necessary to perform equivalent functionality. However, hardware for detecting and executing the 16-bit mode instructions may be eliminated from the execution core.

It is noted that instruction translation unit 14 may include a translation cache for storing translated instruction sequences. The cache may be searched for translated instructions when instructions are conveyed to instruction translation unit 14. If the translated instruction sequence is stored in the translation cache, the instructions may be provided to execution core 16 at a faster rate than that achievable when the instructions are actually translated by instruction translation unit 14. Performance may thereby be increased. It is further noted that, instead of a translation cache, instruction translation unit 14 may be configured to store translated instruction sequences in a main memory coupled to microprocessor 10. In this manner, entire programs may be translated and stored. When the program is executed, no delays due to translation would be experienced.

It is additionally noted that performance of microprocessor 10 may be enhanced if execution core 16 employs modern instruction execution techniques such as register renaming, out of order (speculative) execution, and pipelining. Various embodiments of execution core 16 are contemplated including such performance enhancing features.

It is still further noted that instruction translation unit 14, instead of being configured within microprocessor 10, may be configured separately. A computer system including several different microprocessors which execute dissimilar instruction sets may use an instruction translation unit to translate a program into the instruction set of the microprocessor upon which the program is to be executed. An instruction translation unit configured in this manner may be programmable to perform translations between a plurality of source instruction sets and a plurality of destination instruction sets. Embodiments of instruction translation unit 14 configured in this manner are contemplated.

Figure 6:
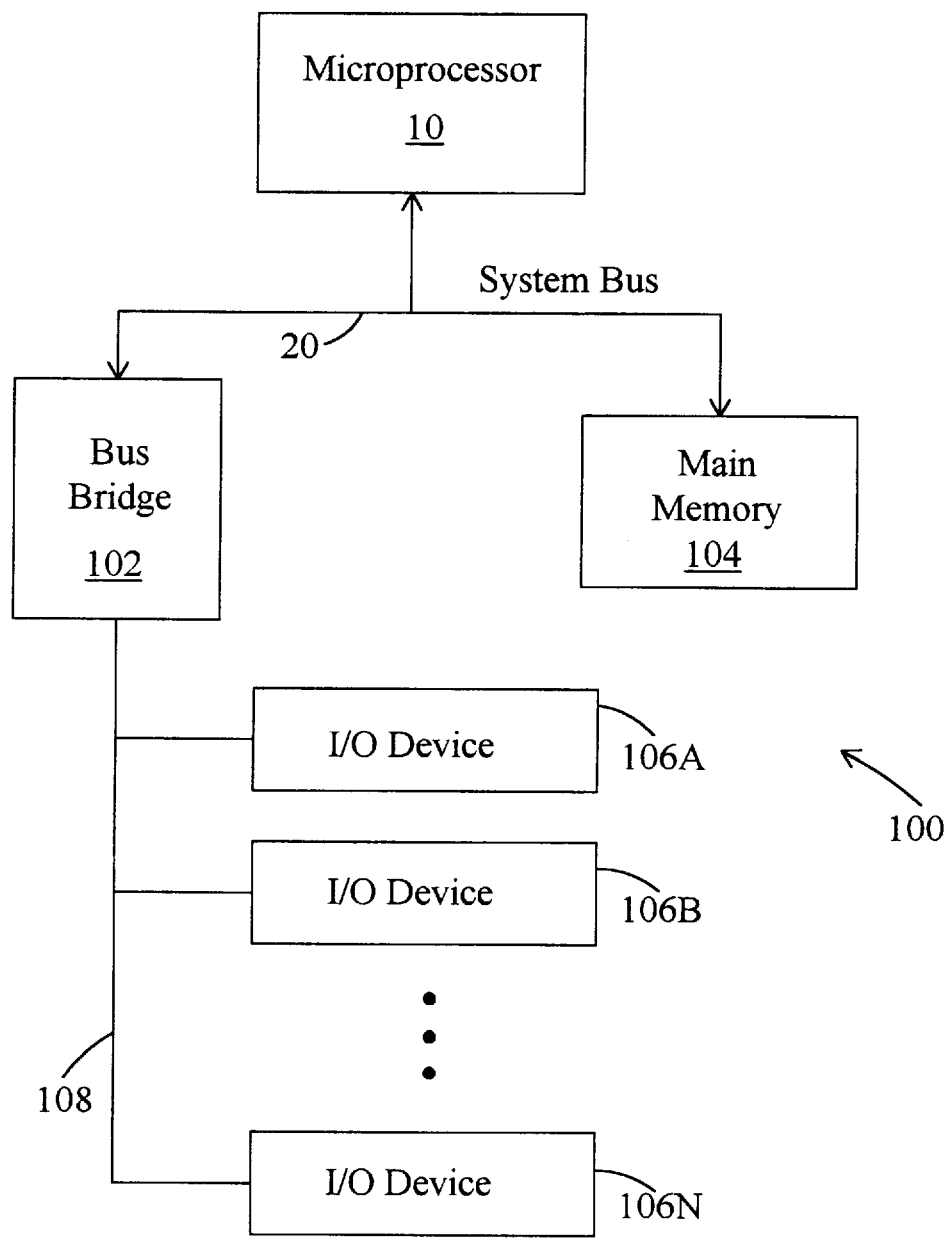
FIG. 6 is a block diagram of a computer system including the microprocessor shown in FIG. 1.

Turning now to FIG. 6, a computer system 100 including microprocessor 10 is shown. Computer system 100 further includes a bus bridge 102, a main memory 104, and a plurality of input/output (I/O) devices 106A–106N. Plurality of I/O devices 106A–106N will be collectively referred to as I/O devices 106. Microprocessor 10, bus bridge 102, and main memory 104 are coupled to system bus 20. I/O devices 106 are coupled to an I/O bus 108 for communications with bus bridge 102.

Bus bridge 102 is provided to assist in communications between I/O devices 106 and devices coupled to system bus 20. I/O devices 106 typically require longer bus clock cycles than microprocessor 10 and other devices coupled to system bus 20. Therefore, bus bridge 102 provides a buffer between system bus 20 and input/output bus 108. Additionally, bus bridge 102 translates transactions from one bus protocol to another. In one embodiment, input/output bus 108 is an Enhanced Industry Standard Architecture (EISA) bus and bus bridge 102 translates from the system bus protocol to the EISA bus protocol. In another embodiment, input/output bus 108 is a Peripheral Component Interconnect (PCI) bus and bus bridge 102 translates from the system bus protocol to the PCI bus protocol. It is noted that many variations of system bus protocols exist. Microprocessor 10 may employ any suitable system bus protocol.

I/O devices 106 provide an interface between computer system 100 and other devices external to the computer system. Exemplary I/O devices include a modem, a serial or parallel port, a sound card, etc. I/O devices 106 may also be referred to as peripheral devices. Main memory 104 stores data and instructions for use by microprocessor 10. As noted above, main memory 104 may store instructions from a source instruction set which microprocessor 10 translates to a target instruction set. Furthermore, main memory 104 may store instructions from the target instruction set. Main memory 104 is divided into a plurality of pages of information, and each page may be defined to store source instructions or target instructions. The definition of the page is conveyed to microprocessor 10 in order to indicate the nature of the instructions within instruction cache 12. In one embodiment, a page comprises 4 kilobytes of storage aligned on a 4 kilobyte boundary. In one embodiment, main memory 104 includes at least one Dynamic Random Access Memory (DRAM) cell and a DRAM memory controller.

It is noted that although computer system 100 as shown in FIG. 6 includes one microprocessor, other embodiments of computer system 100 may include multiple microprocessors similar to microprocessor 10. Similarly, computer system 100 may include multiple bus bridges 102 for translating to multiple dissimilar or similar I/O bus protocols. Still further, a cache memory for enhancing the performance of computer system 100 by storing instructions and data referenced by microprocessor 10 in a faster memory storage may be included. The cache memory may be inserted between microprocessor 10 and system bus 20, or may reside on system bus 20 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, an instruction translation mechanism has been described which translates instructions from a source instruction set to a target instruction set. Advantageously, compatibility may be maintained with software programs written in the source instruction set without including specific hardware to support the source instruction set in the execution cores of microprocessors. Instead, equivalent functionality is obtained through one or more instructions encoded in the target instruction set (which is executed by the execution cores). By freeing the microprocessor execution cores from maintaining compatibility with previous instruction code, the execution cores may implement more advanced and more efficient hardware not achievable if the source instruction set must be supported. Performance thus achieved may be available to software written in the target instruction set, while programs written in the source instruction set execute and may enjoy increased performance as well if atomic operations defined by the source instruction set are recombined more efficiently in the target instruction set.

Numerous variations and modifications will become apparent to those skilled in the art once the above disclosure is fully appreciated. It is intended that the following claims be interpreted to embrace all such variations and modifications.

What is claimed is:

1. A microprocessor comprising:

an instruction cache configured to store instructions from a first instruction set and instructions from a second instruction set, wherein each instruction stored within the instruction cache includes an indication of whether the instruction belongs to said first instruction set or said second instruction set;

an instruction translation unit coupled to receive a first instruction belonging to said first instruction set from the instruction cache, said instruction translation unit comprising:

an instruction atomizing unit configured to generate a plurality of intermediate operations corresponding to said first instruction; and an instruction recombination unit coupled to receive said plurality of intermediate operations and to combine one or more of said plurality of intermediate operations into a second instruction from said second instruction set; and an execution core coupled to receive from said instruction cache said instructions from said second instruction set, and coupled to receive said second instruction from said instruction translation unit;

wherein said instruction cache is configured to selectively provide each instruction stored within said instruction cache to either said instruction translation unit or said execution core depending upon said indication.

2. The microprocessor as recited in claim 1 wherein the execution core is configured to execute instructions from said second instruction set received from said instruction cache, and wherein said execution core is further configured to execute recombined instructions generated by said instruction translation unit including said second instruction.

3. The microprocessor as recited in claim 1 further comprising a dependency checking unit coupled between said instruction atomizing unit and said instruction recombination unit, wherein said dependency checking unit is configured to detect dependencies between said plurality of intermediate operations.

4. The microprocessor as recited in claim 3 wherein said instruction recombination unit is configured not to combine one of said plurality of intermediate operations with another one of said plurality of intermediate operations upon which said one of said plurality of intermediate operations is dependent.

5. A computer system, comprising:

a main memory configured to store instructions from a first instruction set and instructions from a second instruction set; and a microprocessor coupled to said main memory, wherein said microprocessor comprises:

an instruction cache configured to store the instructions from said first instruction set and the instructions from the said second instruction set, wherein each instruction stored within the instruction cache includes an indication of whether the instruction belongs to said first instruction set or said second instruction set;

an instruction translation unit coupled to receive a first instruction belonging to said first instruction set from said instruction cache, wherein said instruction translation unit is configured to reduce said first instruction to a plurality of intermediate operations and to recombine said plurality of intermediate operations into a second instruction from said second instruction set; and an execution core coupled to receive from said instruction cache said instructions from said second instruction set, and coupled to receive said second instruction from said instruction translation unit;

wherein said instruction cache is configured to selectively provide each instruction stored within said instruction cache to either said instruction translation unit or said execution core depending upon said indication.

6. The computer system as recited in claim 5 wherein said execution core is configured to execute instructions from said second instruction set received from said instruction cache, and wherein said execution core is further configured to execute recombined instructions generated by said instruction translation unit including said second instruction.

7. A microprocessor comprising:

an instruction cache configured to store instructions from a first instruction set and instructions from a second instruction set, wherein each instruction stored within the instruction cache includes an indication of whether the instruction belongs to said first instruction set or said second instruction set;

an instruction translation unit coupled to receive a first plurality of instructions belonging to said first instruction set from the instruction cache, said instruction translation unit comprising:

an instruction atomizing unit configured to generate a plurality of intermediate operations corresponding to said first plurality of instructions; and an instruction recombination unit coupled to receive said plurality of intermediate operations and to combine said plurality of intermediate operations corresponding to said first plurality of instructions into a second instruction from said second instruction set; and an execution core coupled to receive from said instruction cache said instructions from said second instruction set, and coupled to receive said second instruction from said instruction translation unit;

wherein said instruction cache is configured to selectively provide each instruction stored within said instruction cache to either said instruction translation unit or said execution core depending upon said indication.

8. The microprocessor as recited in claim 7 wherein the execution core is configured to execute instructions from said second instruction set received from said instruction cache, and wherein said execution core is further configured to execute recombined instructions generated by said instruction translation unit including said second instruction.

9. The microprocessor as recited in claim 7 further comprising a dependency checking unit coupled between said instruction atomizing unit and said instruction recombination unit, wherein said dependency checking unit is configured to detect dependencies between said plurality of intermediate operations.

10. The microprocessor as recited in claim 9 wherein said instruction recombination unit is configured not to combine one of said plurality of intermediate operations with another one of said plurality of intermediate operations upon which said one of said plurality of intermediate operations is dependent.

* * * * *